(12) United States Patent
Niikawa

(10) Patent No.: US 6,757,479 B1
(45) Date of Patent: Jun. 29, 2004

(54) IMAGE DISPLAY FOR REPRODUCING A PLURALITY OF IMAGES WHICH ARE RECORDED IN A RECORDING MEDIUM

(75) Inventor: Masahito Niikawa, Sakai (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/236,898

(22) Filed: Jan. 26, 1999

(30) Foreign Application Priority Data

Jan. 27, 1998 (JP) .......................................... 10-014503

(51) Int. Cl.⁷ ................................................ H04N 5/91
(52) U.S. Cl. ....................................... 386/68; 386/125
(58) Field of Search ........................... 386/46, 95, 109, 386/112, 120, 121, 125, 68, 70; 707/1

(56) References Cited

U.S. PATENT DOCUMENTS

| 5,485,611 A | * | 1/1996 | Astle ............................. 707/1 |
| 5,576,950 A | * | 11/1996 | Tonomura et al. ............ 386/95 |
| 5,685,002 A |   | 11/1997 | Sano |
| 5,724,579 A |   | 3/1998 | Suzuki |

FOREIGN PATENT DOCUMENTS

| JP | A-8-223525 | 8/1966 |
| JP | A-4-000971 | 1/1992 |
| JP | A-6-086222 | 3/1994 |
| JP | 6-96130 | 4/1994 |
| JP | A-6-309376 | 11/1994 |
| JP | A-7-245723 | 9/1995 |

OTHER PUBLICATIONS

Yoshinobu Tonomura, et al. "Structured Video Computing," IEEE Multimedia, Fall 1994, pp. 34–43.*

* cited by examiner

Primary Examiner—Huy Nguyen
(74) Attorney, Agent, or Firm—Burns, Doane, Swecker & Mathis, L.L.P.

(57) ABSTRACT

An image display device displays images at every frame for browsing without a trouble of assigning key information for image data of image files. In an operation for browsing contracted image data of an image file, if the number of image frames is large, the image display device increases a browsing speed by shortening a display time for one frame. Thus, a target image is found easily and speedily.

10 Claims, 11 Drawing Sheets

DATA ARRANGEMENT IN MEMORY CARD 8

DATA ARRANGEMENT IN MAGNETO-OPTIC DISK 14

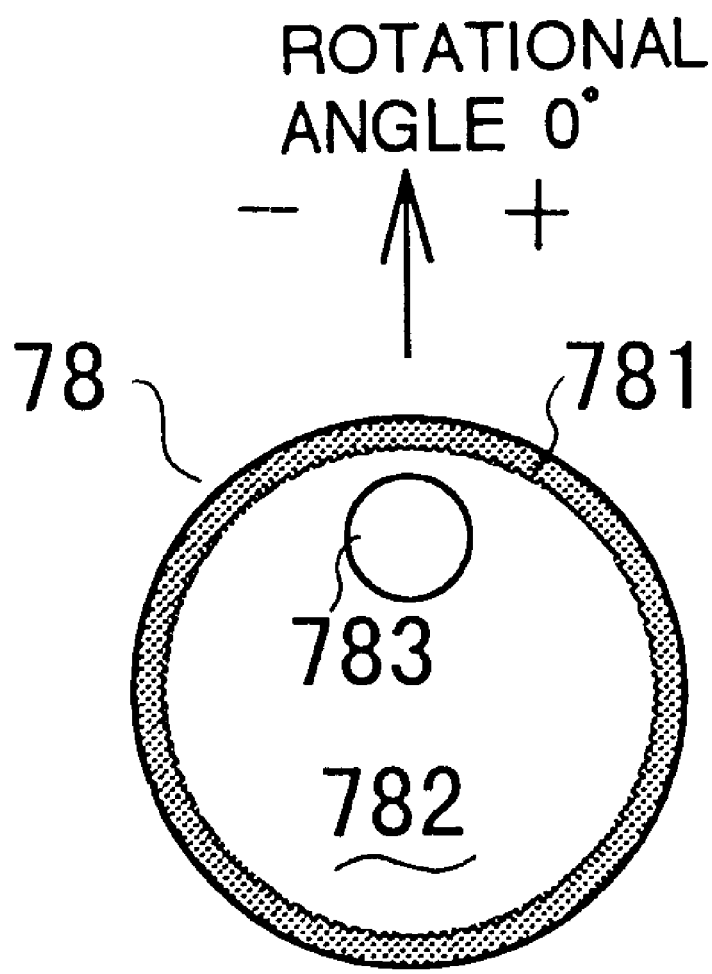

FIG. 8(a)  DISPLAY-PART DESIGNATION 1
MAGNETO-OPTIC DISK
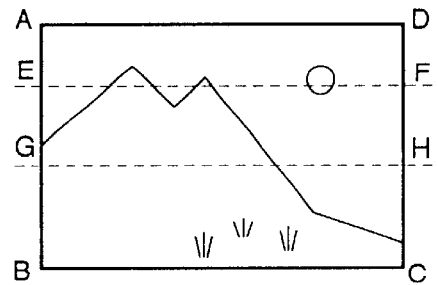
FIG. 8(b)
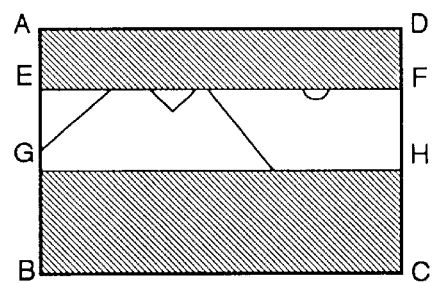
FIG. 8(c)  DISPLAY-PART DESIGNATION 2
MEMORY CARD
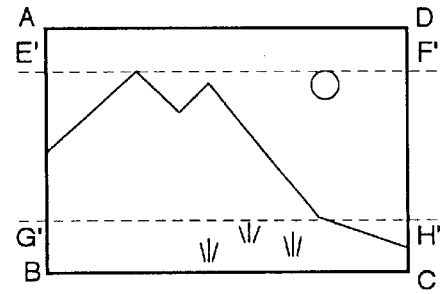
FIG. 8(d)
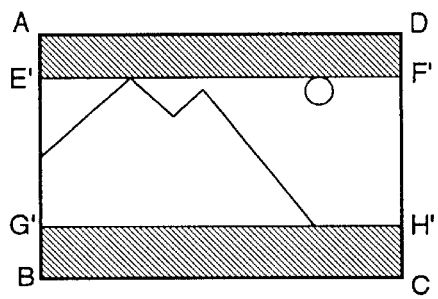

IMAGE DISPLAY FOR REPRODUCING A PLURALITY OF IMAGES WHICH ARE RECORDED IN A RECORDING MEDIUM This application is based on Patent Application No.10-014503 filed in Japan, the contents of which are hereby incorporated by reference.

This invention relates to an image display device which displays images photographed by an apparatus such as a digital camera, and especially relates to an art for retrieving and looking through images.

BACKGROUND OF THE INVENTION

Hitherto, there has been known an image database in which data of images photographed by the apparatus such as a digital camera are recorded in an image-recording medium, and a retrieval system thereof. The image database of this kind, which relates key information (code information) to image data of image files, is generally aimed at finding a target image by inputting key information in a retrieval operation performed by a retrieval system. On the other hand, there has also been known a system having a function for retrieving and looking through (named as "browsing") the target image by sequentially displaying the images recorded in the image database into the display device. The system of this kind is aimed at finding the target image by a visual judgment of an operator by displaying the image at every frame in addition to the retrieval based on key information.

In the above-mentioned former system, it is impossible to find the target object through the retrieval operation without operations of systematizing and inputting key information. However, these operations require considerable effort. Especially, as to the image data in the digital camera, it needs to input key information in a photographing operation (because these may be forgotten unless inputted immediately), but this operation is generally troublesome, and besides, users may let the shutter chance slip away while inputting the key information.

In the above-mentioned latter system, the system practically and exactly finds the target image in the browsing operation for several dozens of image data. However, as to increased numbers of image data, the system takes a great deal of time to browse, which is inefficient and impractical. Especially in the digital camera which eliminates the need for processing of developing, printing, and enlarging, users usually take greater numbers of photographs compared in the case of a camera using a film, so that number of image data tends to increase.

SUMMARY OF THE INVENTION

The present invention is made to dissolve the problems as noted above. One object of the present invention is to provide an image display device wherein images are displayed frame by frame for looking through without a trouble of assigning key information to image data of image files, which easily and efficiently finds a target image even for increased numbers of image data.

In order to attain the above object, according to one aspect of the present invention, an image display device for reproducing a plurality of images based on image data recorded in a recording medium, comprises: a mode selector which makes a selection of browsing mode in which contracted images of said images are sequentially reproduced; and, a controller which carries out a control so as to shorten display time for each frame of said contracted images when a number of said images is judged to be large in said browsing mode.

According to further aspect of the present invention, an image display device for reproducing a plurality of images based on image data recorded in a recording medium, comprises: a mode selector which makes a selection of browsing mode in which partial images of said images are sequentially reproduced, and; a controller which carries out a control so as to decrease a size of the part selected as said partial image when the number of said images is judged to be large in said browsing mode.

BRIEF DESCRIPTION OF THE DRAWINGS

FIG. 6 is a view showing a structure of a jog shuttle.

FIG. 7($b$) is a flowchart in a high-speed browsing mode according to a second embodiment of the present invention.

FIGS. 8($a$) and 8($b$) are views showing display-part designation 1, and FIGS. 8($c$) and 8($d$) are views showing display-part designation 2.

DETAILED DESCRIPTION OF THE PREFERRED EMBODIMENT OF THE PRESENT INVENTION

Some embodiments of the present invention will hereinafter be described with reference to the drawings.

Figure 1:
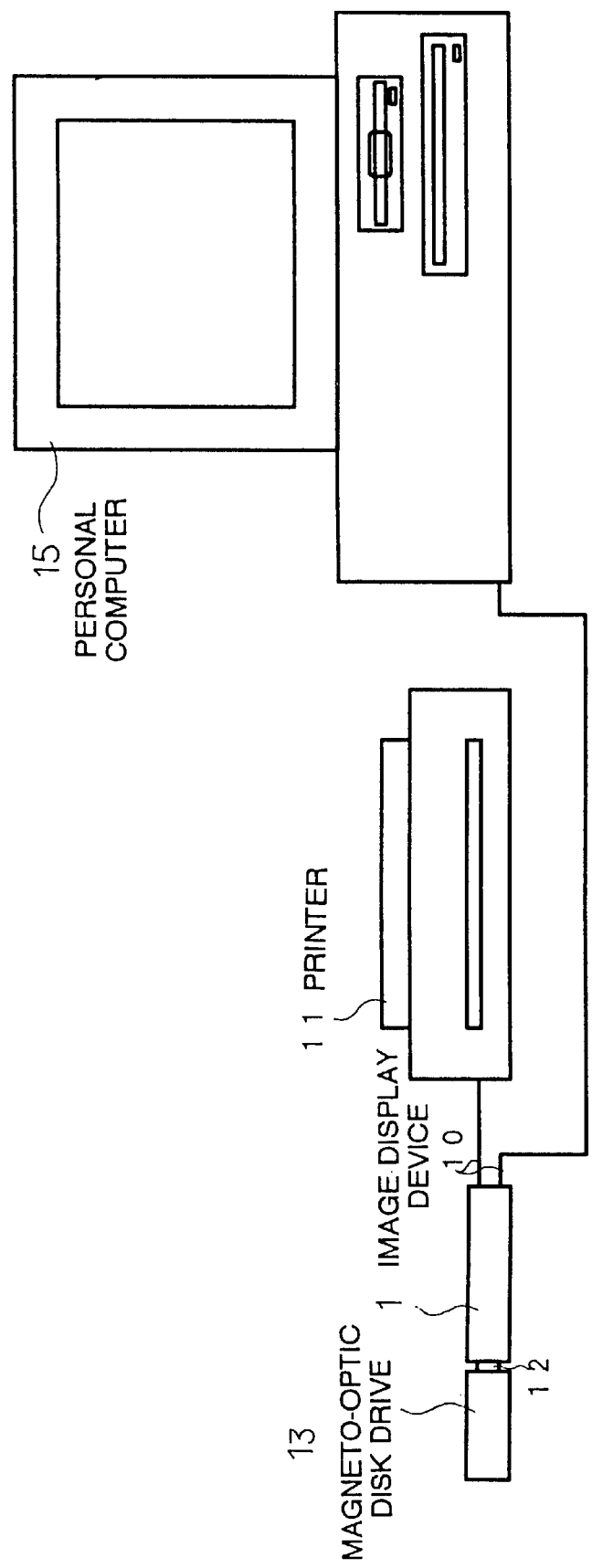
FIG. 1 is a structural view of system including an image display device according to a first embodiment of the present invention.
Figure 2:
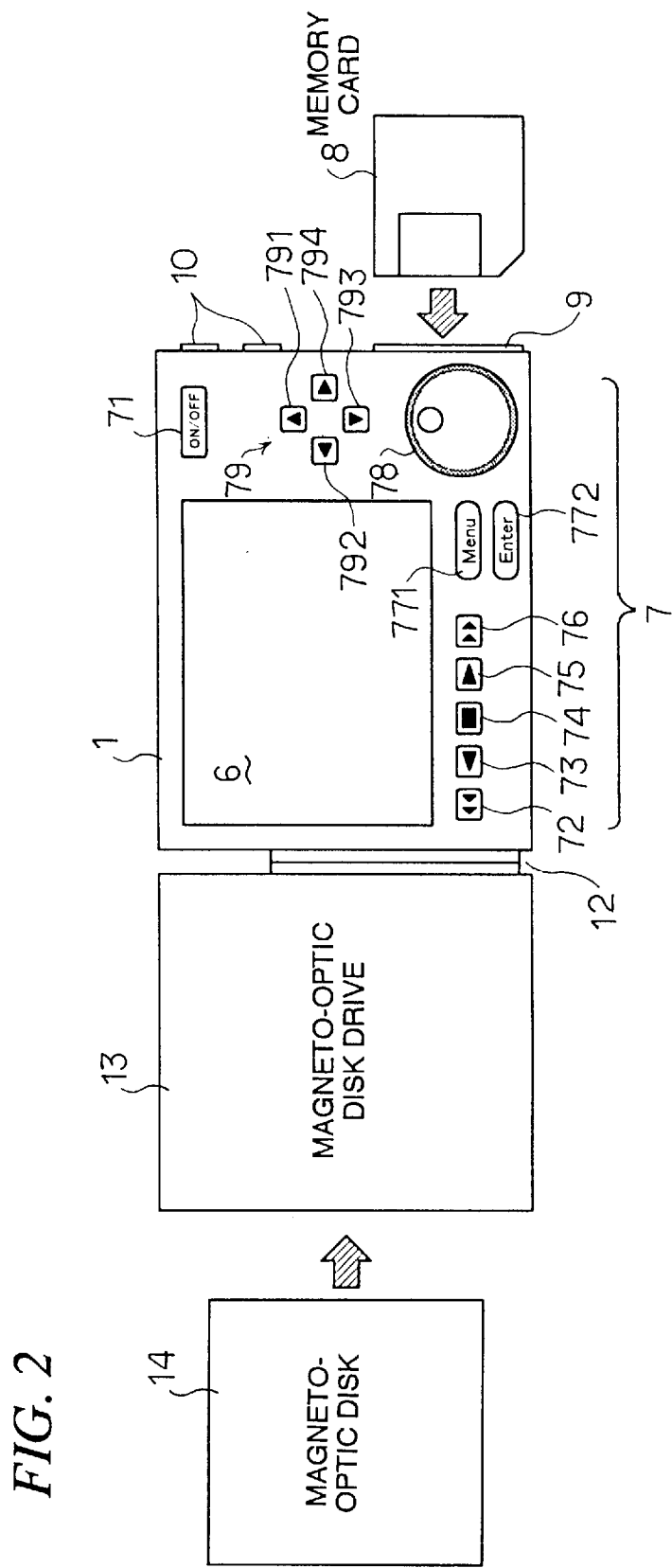
FIG. 2 is a front view of the image display device.
Figure 3:
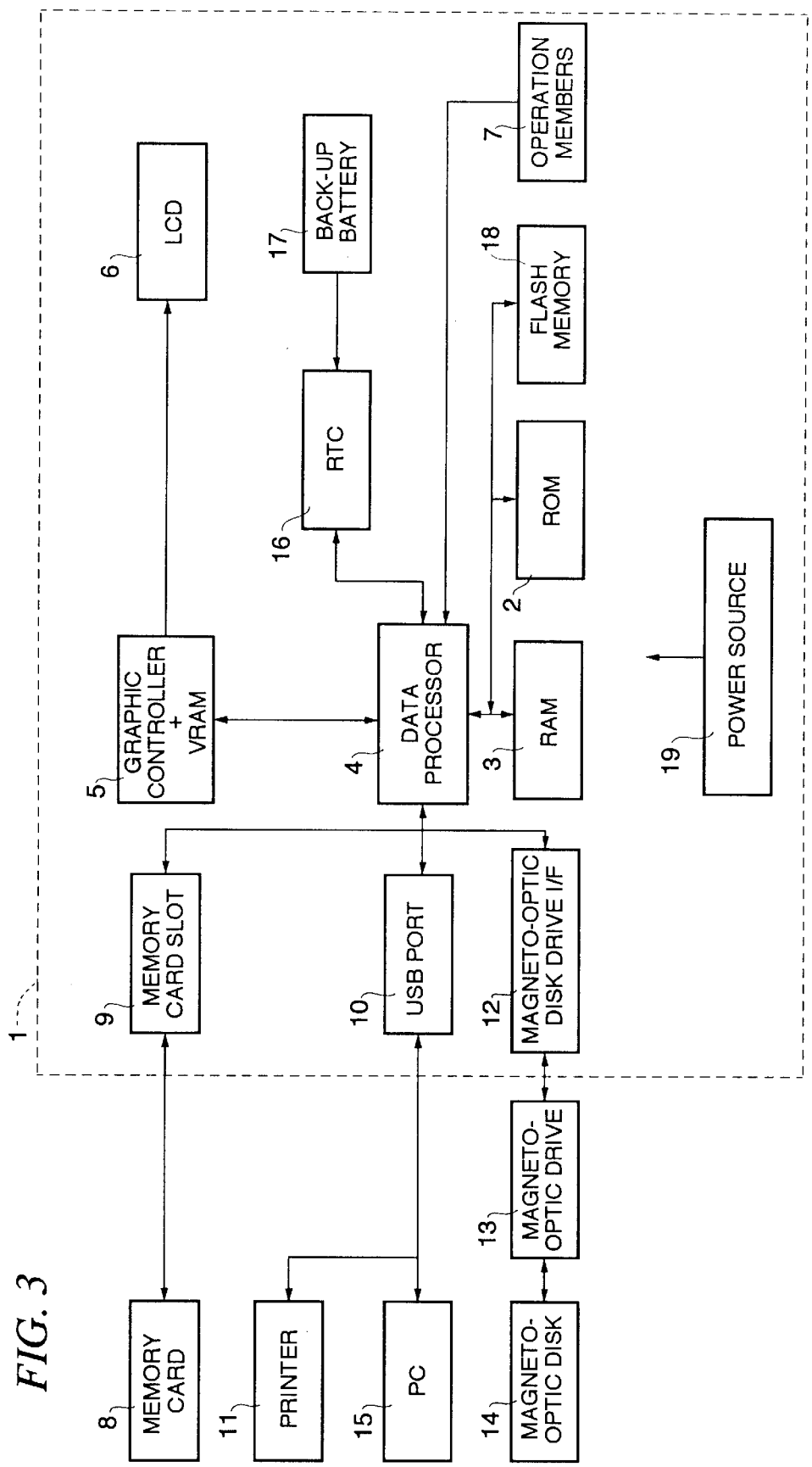
FIG. 3 is a block diagram of the image display device.

In FIGS. 1 to 3 explaining an image display device of the first embodiment of the present invention, a body 1 of the image display device is provided with a memory card slot 9 through which a memory card 8 (image-recording medium) is inserted, and with two of USB (universal serial bus) ports 10 into which a printer 11, a PC (personal computer) 15 and the like are connected. The memory card 8 stores image data recorded by a digital camera. The body 1 of the image display device directly makes connection to a magneto-optic disk drive 13 for driving a magneto-optic disk 14 (image-recording medium) through a magneto-optic disk interface 12. The image based on image data recorded in the memory card 8 or the magneto-optic disk 14 is displayed on a LCD (liquid crystal display) unit 6 by operating the operation members 7 of the body 1. The display unit 6 also displays operation menus for carrying out various operations.

A CPU (central processing unit) in a data processor 4 reads out programs which are stored in a ROM (read only memory) 2, and controls the memory card slot 9, USB port 10, magneto-optic disk interface 12, a graphic controller and VRAM 5, the LCD unit 6 and operation members 7. Thus, the entire control of the body 1 is carried out. The data processor 4 is connected to a RTC (real time clock) 16 which is driven by a backup battery 17, thereby writing date and time of data processing into the magneto-optic disk 14 and memory card 8. The body 1 further comprises a flash memory 18 in which a result of transferring data into the magneto-optic disk 14 is recorded. The body 1 obtains electricity supplied from the battery in a power source 19, besides can obtain electricity supplied by an unshown AC (alternating current) adapter.

Next, a data arrangement in the memory card 8 will be explained referring to FIG. 4(*a*). The image data recorded by the digital camera contains 40 frames, and each of frames contains a tag (index) information part, high-resolution image data for displaying high-resolution image (640×480 pixels) which is compressed in JPEG (joint photographic experts group) format, and thumbnail image data (80×60 pixels) for displaying a contracted image or a low-resolution image. The image data can be managed as an EXIF-format (exchangeable image file format) image file in a unit of frames. The tag information part stores data such as photographing date, a state of the flash (ON or OFF) in a photographing operation.

Figure 4A:
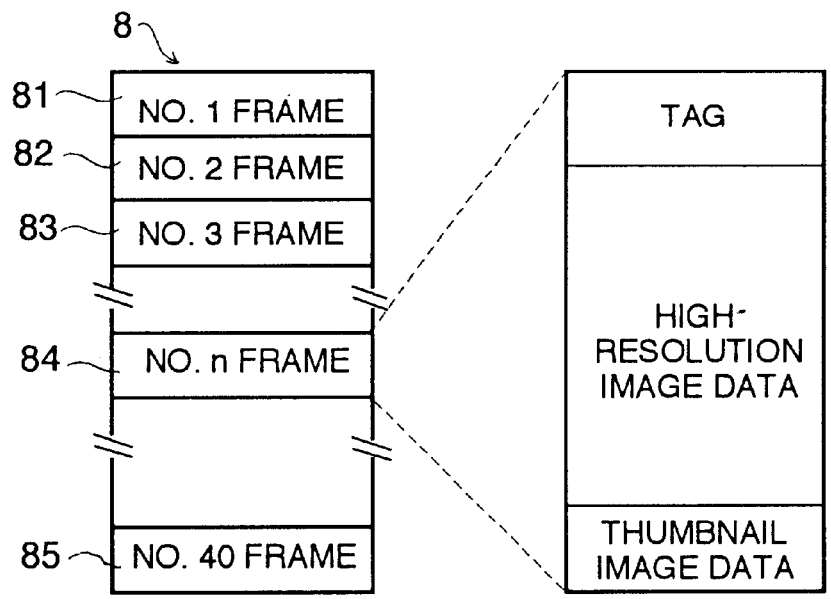
FIG. 4($a$) is a view showing a data arrangement in a memory card, and FIG. 4($b$) is a view showing a data arrangement in a magneto-optic disk.
Figure 4B:
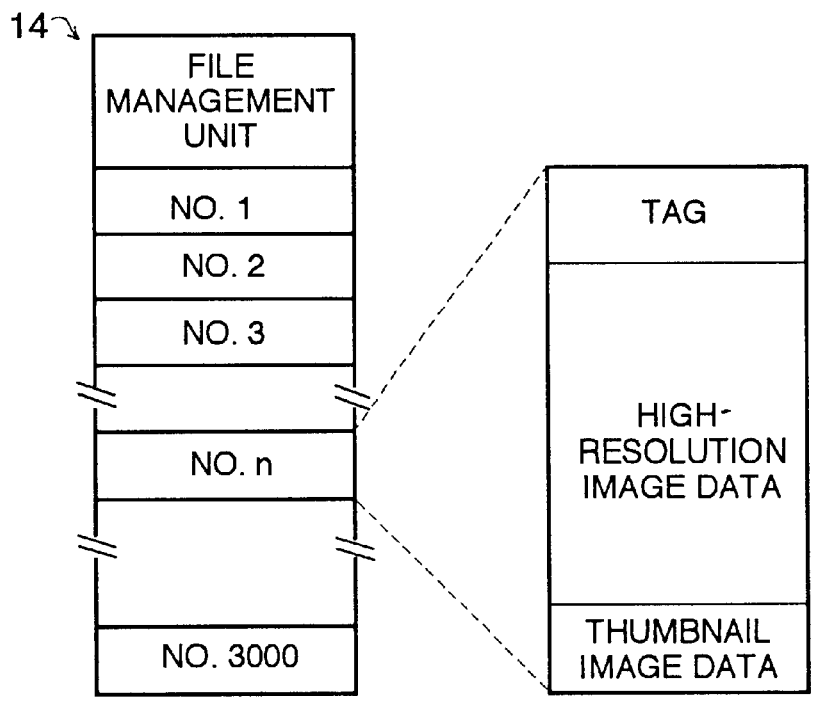

Referring to FIG. 4(*b*), a data arrangement in the magneto-optic disk 14 will be explained. The magneto-optic disk 14 can record the image data transferred from the memory card 8. The in recorded data are assigned numbers of the image file such as No.1, No.2, No.3, . . . No.n, . . . , No.3000 in recorded order. As in the case of the memory card 8, each of the files records high-resolution image data, thumbnail image data, and tag information. Also, the magneto-optic disk 14 includes a file management unit for managing each of image files. The file management unit contains file allocation data such as the whole structure of the directories or the file numbers, and file names, and contains tables for making correspondences between the files, and directories.

Figure 5:
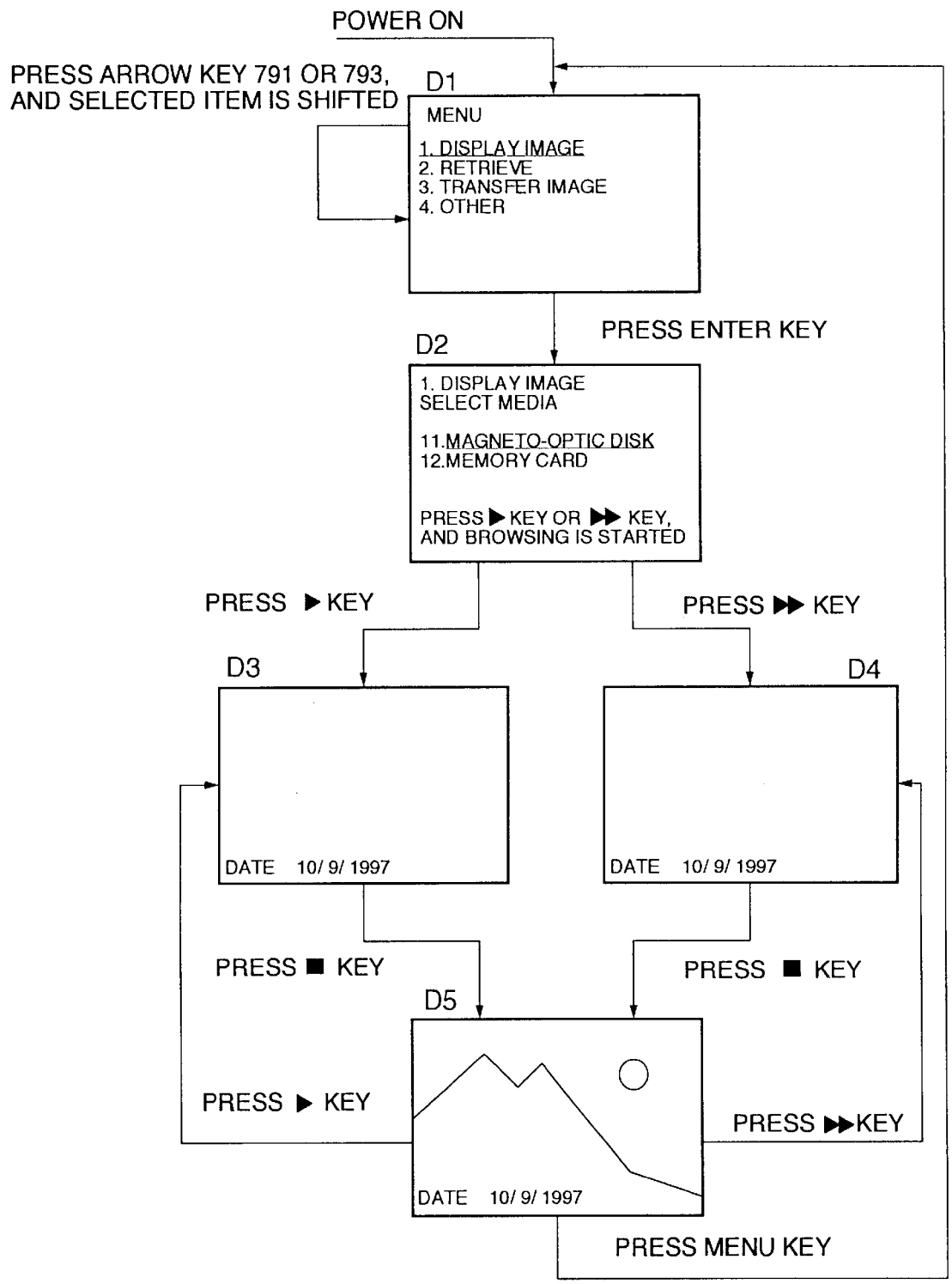
FIG. 5 is a view explaining a transition of screen views on a liquid crystal display unit.

Referring to FIG. 5, a transition of screen views on the LCD unit 6 of the body 1 of the image display device will be explained. By connecting the magneto-optic disk drive 13 to the body 1 of the display device and turning on a power switch 71 of the body 1, the program in the ROM 2 which is connected to the data processor 4, is read out. After an initializing process of the RAM 3 etc. following the procedure in the ROM 2, the operation unit 7, memory card slot 9, USB ports 10, and magneto-optic disk interface 12 are enabled. Then, the data processor 4 controls the graphic controller and VRAM 5, which displays an initial screen D1 on the LCD unit 6. In the screen D1 in the figure, "DISPLAY IMAGE" is selected out of options. By pressing the up and down arrow keys 791 and 793 (FIG. 2) in the state of D1, the options change in rotation. In a state of selecting "DISPLAY IMAGE", by pressing an enter key 772, a screen D2 for selecting a medium is displayed.

Here, the current selection is the one that is inserted; i.e. either of the magneto-optic disk 14 and memory card 8. Concerning the other one that is not inserted, it is possible to make unelectable state, or change the way of display. One of the examples is to display it palely. When both of the magneto-optic disk 14 and memory card 8 are inserted, the magneto-optic disk is preferentially selected, but the memory card can be selected by the manipulation with the arrow key. Also, it is possible to make a structure in which the memory card is preferentially selected. If the magneto-optic disk is selected in the screen D2 for displaying every frame for looking through, by pressing the forward key 75 in the state of the screen D2, the high-resolution image is displayed at every frame in the order of the photographing date out of the image files in the magneto-optic disk. On the other hand, if the memory card is selected in the screen D2, it displays the high-resolution image at every frame in the order of the photographing date (browsing mode; screen D3) out of the image files in the memory card. If the stop key 74 is pressed in the above-mentioned browsing mode, the browsing is stopped, and the screen remains the state of the stop key 74 being pressed (screen D5).

On the other hand, if a fast-forward key 76 is pressed in the state of the screen D2, and if the magneto-optic disk is selected in the screen D2, the low-resolution image is displayed frame by frame in the order of the photographing date out of the image files in the magneto-optic disk. If the memory card is selected in the screen D2, the low-resolution image based on the thumbnail data in the memory card is displayed frame by frame in the order of the photographing date at high speed (i.e., time for looking through one frame is decreased) (high-speed browsing mode; screen D4). The size of the thumbnail data is 80×60 pixels, and its display area is 640×480 pixels. As to the image display, the thumbnail image data is complemented to display an expanded view for increased visibility. An expanded rate is determined for obtaining an appropriate display speed. In order to display the image at higher speed, the expanded rate is decreased. It is also possible to display the image as the contracted image without expanding it.

The display time is altered as shown in the following table 1 between in the case of the high-speed browsing operation for the magneto-optic disk 14 and in the case of the high-speed browsing operation for the memory card 8. In the case of the high-speed browsing operation for the magneto-optic disk 14, number of frames to be browsed is increased (max. 3000 frames), so the browsing operation is performed as fast as performance of the hardware allows within human visibility. To the contrary, in the case of the high-speed browsing operation for the memory card 8, the memory card is a 2 MB card having around 40 frames, so the browsing speed is set up at appropriate speed by adopting wait (delay). The display time in each of the modes is shown below:

TABLE 1

| Media | browsing mode | High-speed browsing mode |
| --- | --- | --- |
| Magneto-optic disk | High-resolution image display Display time 3 sec. | Low-resolution or contracted image display Display time 0.2 sec. |
| Memory card | High-resolution image display Display time 3 sec. | Low-resolution or contracted image display Display time 0.5 sec. (Adopt wait) |

If the stop key 74 is pressed in the high-speed browsing mode, the high-speed browsing mode is stopped, and the screen remains the state of the stop key 74 being pressed (screen D5). When the menu key 771 is pressed in the state of the screen D5, the screen changes into the screen D1, and when the forward key 75 is pressed again, the screen changes into the browsing mode. When the fast-forward key 76 is pressed, the screen changes into the high-speed browsing mode. The above-described display control allows the display time for looking through one frame to be decreased, which makes it possible to retrieve a target image easily and speedily without assigning the key information to the image files.

The explanation is nextly given to a case of manipulating a jog shuttle 78. As shown in FIG. 6, the jog shuttle 78 has an outer wheel 781 and an inner rotational member 782. The wheel 781 rotates in a range of ±90°, and has equal functions as following keys according to rotational angles:

+10° to +30°: forward key 75
+50° to +70°: fast-forward key 76
−10° to −30°: reverse key 73
−50° to −70°: fast-reverse key 72

The outer wheel 781 is urged by a spring, and is in a position of 0° unless its rotational angle is held with a finger. The inner rotational member 782 is provided with a concavity 783 for placing the finger, and with a click-stop and a contact point in every 30° increment. When an image is displayed in the screen D5, and if the rotational member 782 is turned around into +direction in one unit of increment, the screen displays the image of a next following frame. Also, if the rotational member 782 is turned around into —direction in one unit of increment, the screen displays an image of an immediately preceding frame.

Figure 7A:
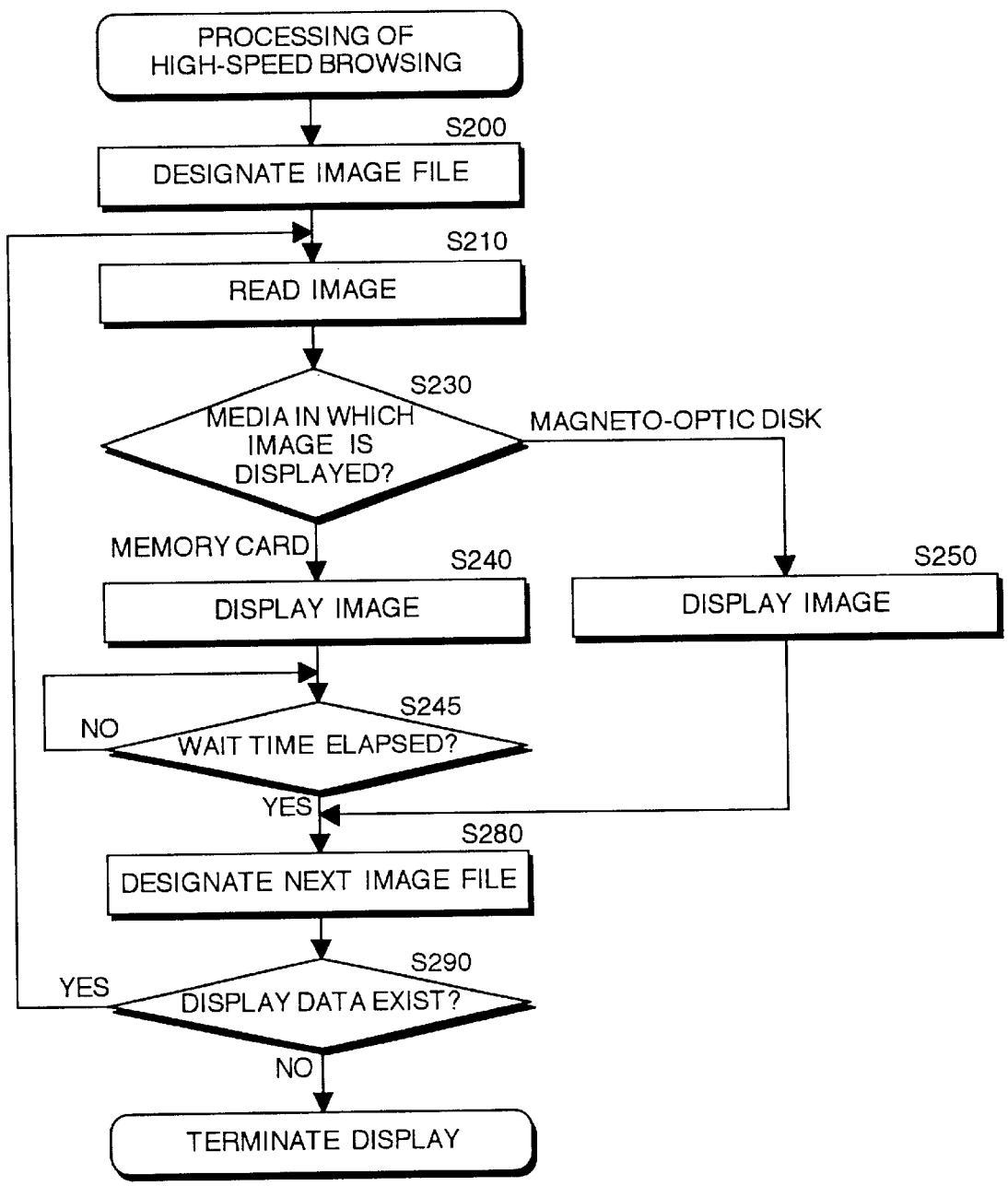
FIG. 7($a$) is a flowchart in a high-speed browsing mode according to the first embodiment of the present invention.
Figure 7B:
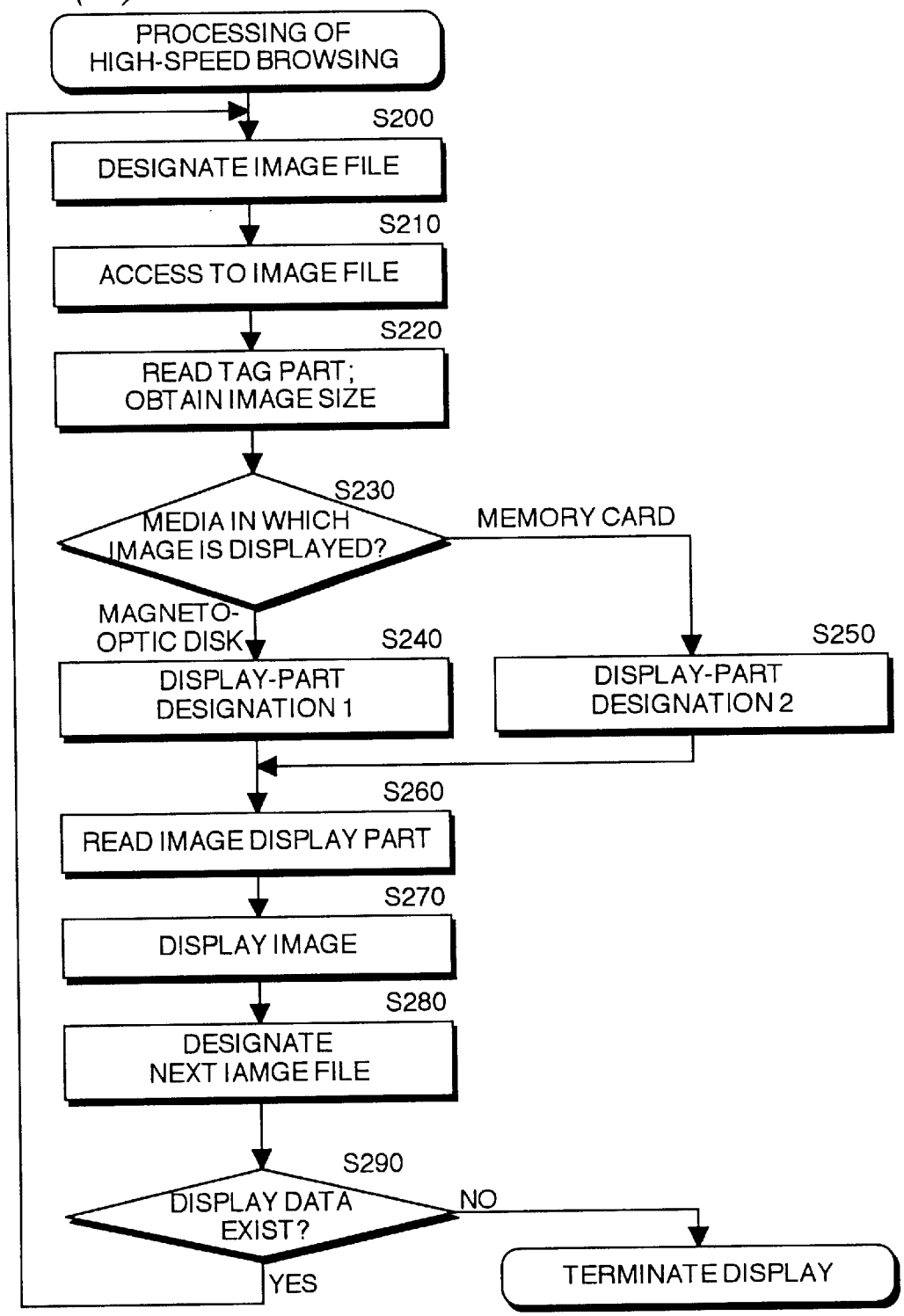

The high-speed browsing mode in the above-described first embodiment is explained referring to a flowchart shown in FIG. 7(*a*). As shown in the figure, if the media in which the image is displayed, is the memory card (YES in S230), following the image display (S240), the procedure goes to a step for waiting until a wait-time elapses (S245). In steps S245 and S250 for displaying the image, the low-resolution or contracted image based on the thumbnail data is displayed. The processing in other steps is same as corresponding steps in later-described FIG. 7(*b*), so that no explanation thereof is provided in this paragraph.

The high-speed browsing mode in a second embodiment of the present invention will be described as follows. The first embodiment is the one that the images based on the thumbnail data are displayed in the high-speed browsing mode, but there may be the case of the absence of the thumbnail image data corresponding to the image data in some image file formats. Accordingly, the second embodiment is the one that only the central part of the image is displayed in the above-mentioned case. FIG. 7(*b*) shows a flowchart of the high-speed browsing mode in the second embodiment. In a processing of the high-speed browsing mode, the first step to do is to designate an image file to be displayed (S200). In this case, a user designates in a frame number. Then, the procedure goes to a step for accessing to the image file (S210), and a step for reading out tag part (S220). Here, the size of the image is acquired. After that, just as in the case described in FIG. 5, the medium which is selected in the medium selection screen D2, is distinguished between the memory card and the magneto-optic disk (S230). Depending on a kind of a medium, a part to be displayed is determined to be a display-part designation 1 or a display-part designation 2 (S240 and S250).

If the magneto-optic disk is selected as the medium, as the display-part designation 1 shown in FIGS. 8(*a*) and 8(*b*), the procedure goes on to calculate a position of a central part □EGHF of the image based on the size of the image acquired in S220, and to read out the data corresponding to □ EGHF part from the image files (S260), then to display the image (S270).

If the memory card is selected as the medium, as the display-part designation 2 shown in FIGS. 8(*c*) and 8(*d*), the procedure goes on to calculate a position of a central part □ E'G'H'F' of the image based on the size of the image acquired in S220, and to read out the data corresponding to □ E'G'H'F' part from the image files (S260), then to display the image (S270). After that, the procedure goes to a step for designating the next image data (S280). If it is judged that the next data does not exist (NO in S290), the processing is terminated. If it is judged that the next data exist (YES in S290), the procedure from S200 to S290 is repeated.

Figure 9:
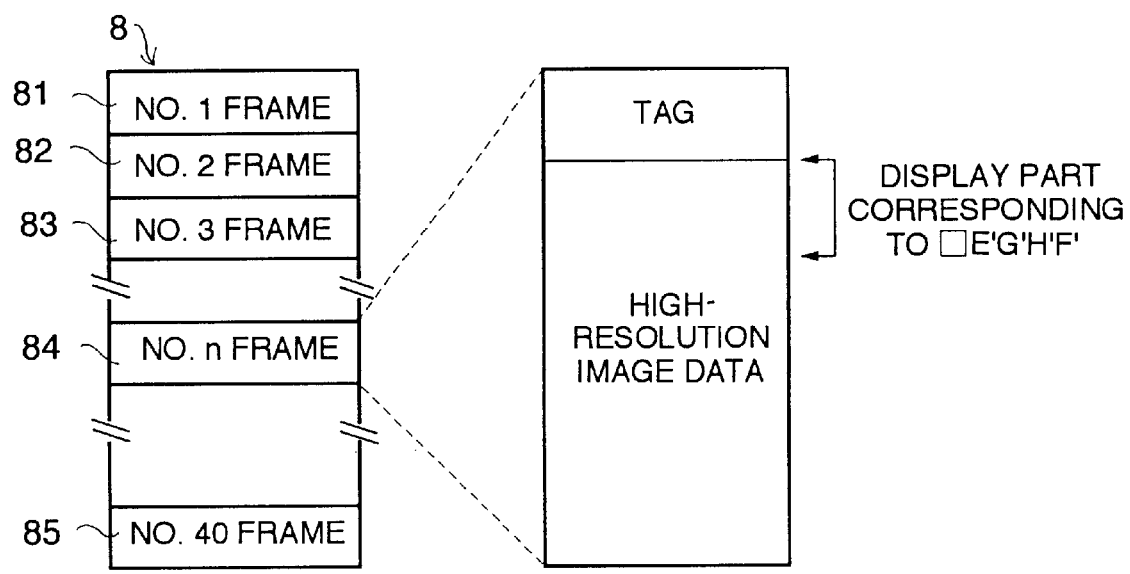
FIG. 9 is a view showing a data arrangement in a memory card according to the second embodiment of the present invention.

Concerning the data used for display (display-data) in the high-speed browsing mode, □ EGHF (the display-part designation 1) is smaller than □ E'G'H'F' (the display-part designation 2). The display time for one frame of the magneto-optic disk (max. 3000 frames) is shorter than that of the memory card. That is, the display time for one frame is decreased in the case of performing the high-speed browsing operation for larger number of frames. This display control decreases the display-data size for a large number of image data frames, which hastens the speed for looking through the frames, and achieves the equal effect as the above-described one. Said □ EGHF is calculated so as to make the total amount of the data constant, thereby equalizing the display time for each of the frames. The □EGHF is calculated so as to make a height EG of the image constant, which increases the visibility even in a wide image. The same goes for □ E'G'H'F'. FIG. 9 shows a data arrangement in the memory card 8 of the second embodiment. This memory card 8 has none of thumbnail images. The magneto-optic disk has none of thumbnail images, too.

Figure 10:
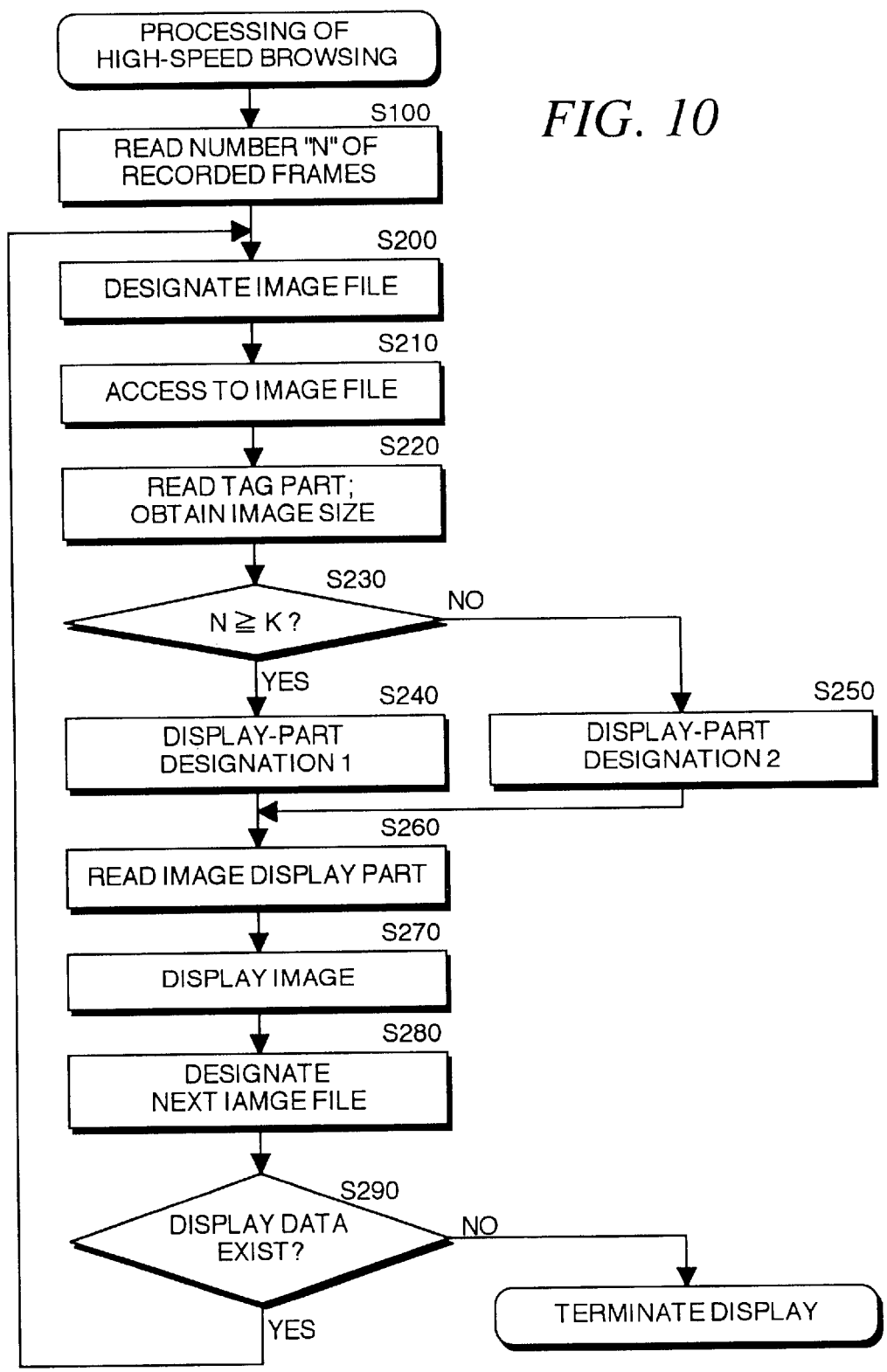
FIG. 10 is a flowchart in a high-speed browsing mode according to a third embodiment of the present invention.

Next, the high-speed browsing mode in the third embodiment of the present invention will be described as follows. In the above-described second embodiment, display part of the image in the high-speed browsing mode is altered in accordance with the kind of the medium in which the image to be displayed is stored. However, it is possible to alter the display part in accordance with number of the image frames which are recorded in each of the medium. Such a control is applied in the third embodiment. FIG. 10 shows a flowchart of the high-speed browsing mode according to the third embodiment. In this processing, the difference from the above-described FIG. 7(*b*) is to read out number N of recorded frames (S100), and to decide upon the above-mentioned display-part designation 1 (S240) in a case of N≧K (K: predetermined number) at a step S230, and decide upon the display-part designation 2 in a case of N<K (S250). Other processing is the same as FIG. 7(*b*). This control also achieves the equal effect of the above-mentioned one.

As explained above, when the image files contain a large number of image data frames, the image-display device of the present invention sequentially displays the contracted image or low-resolution image for looking through frame by frame at high-speed, which makes it possible to retrieve image files easily and speedily without giving the key information to the image data of the image files.

Moreover, if the image files contain a large number of image data frames, the device decreases the display-data amount for displaying a part of the image files for looking through, which hastens the speed for looking through the images, thereby making it possible to retrieve targets image easily and speedily.

The present invention is not limited to the above-described embodiment, but includes varied or modified embodiments from the above. Each of the above-described embodiments shows a device specifically having a function of displaying images. However, the present invention can be applied to photographing apparatus such as a digital camera or a video camera capable of recording still-frame pictures, which have a similar function. Also, the present invention can be applied to a computer system itself, which has a similar function.

What is claimed is:

1. An image display device for reproducing a plurality of images based on image data recorded on a recording medium, said image display device comprising:

a mode selector which makes a selection of a browsing mode along a plurality of browsing modes, wherein said plurality of browsing modes includes a first browsing mode in which contracted images of the recorded image data are sequentially reproduced; and controller which executes control either to display each frame of said contracted images for a given, first display time, or to display each frame of said contracted images for a given, second display time, and wherein the first display time is shorter than the second display time and wherein said first display time is selected when the number of images is judged to be above a threshold value in said first browsing mode.

2. The device as claimed in claim 1, wherein the data of each frame of said images and the data of the contracted image corresponding to said frame are beforehand stored in a same image file.

3. The device as claimed in claim 1, wherein said recording medium is removable from said image display device, and the numbers of said images are judged depending on a kind of said recording medium.

4. The device as claimed in claim 3, further comprising a slot into which said recording medium is detachable and attachable.

5. The device as claimed in claim 4, wherein said recording medium is a memory card.

6. The device as claimed in claim 3, further comprising an interface to which a drive for said recording medium is attachable.

7. The device as claimed in claim 6, wherein said recording medium is a disk.

8. The device as claimed in claim 1, wherein said display device is used as a system which contains a computer.

9. The device as claimed in claim 1, wherein the contracted images are expanded, and displayed as low resolution images.

10. The device as claimed in claim 1, wherein the shortened display time for each frame does not exceed human visibility.

* * * * *